United States Patent
Aoki et al.

(10) Patent No.: US 6,417,258 B1
(45) Date of Patent: Jul. 9, 2002

(54) ANTIFOAMING COMPOSITIONS

(75) Inventors: Yoshitaka Aoki; Akinari Itagaki, both of Usui-gun (JP)

(73) Assignee: Shin-Etsu Chemical Co., Ltd. (JP)

( * ) Notice: Subject to any disclaimer, the term of this patent is extended or adjusted under 35 U.S.C. 154(b) by 0 days.

(21) Appl. No.: 09/515,685

(22) Filed: Feb. 29, 2000

(30) Foreign Application Priority Data

Mar. 1, 1999 (JP) .......................................... 11-052341

(51) Int. Cl.$^7$ .......................... B01D 19/04; C08L 83/12
(52) U.S. Cl. .................. 524/266; 524/588; 524/757; 524/762; 516/74; 516/76; 516/117; 516/118; 516/124
(58) Field of Search ................................ 516/118, 117, 516/124, 74, 76; 524/265, 757, 762, 837, 266, 588

(56) References Cited

U.S. PATENT DOCUMENTS

| 3,784,479 A | 1/1974 | Keil ............................. 516/124 |
| 3,984,200 A | 10/1976 | Doesburg ..................... 516/124 |
| 3,984,347 A | 10/1976 | Keil ............................. 516/118 |
| 4,749,740 A | 6/1988 | Aizawa et al. ............... 516/123 |
| 5,153,258 A | 10/1992 | Nakahara et al. ............ 516/117 |
| 5,283,004 A | 2/1994 | Miura ........................... 516/117 |
| 5,376,301 A | 12/1994 | Fleuren et al. ............... 516/118 |
| 5,380,464 A | 1/1995 | McGee ......................... 516/118 |
| 5,916,090 A * | 6/1999 | Itagaki et al. ................ 516/117 |
| 5,990,181 A * | 11/1999 | Spyropoulos et al. ........ 516/118 |

FOREIGN PATENT DOCUMENTS

| JP | 52-19836 | 5/1977 |
| JP | 52-22638 | 6/1977 |
| JP | 55-23084 | 6/1980 |
| JP | 63-147507 | 6/1988 |
| JP | 1-317505 | 12/1989 |
| JP | 3-14481 | 2/1991 |
| JP | 3-14482 | 2/1991 |
| JP | 3-188905 | 8/1991 |
| JP | 4-42043 | 7/1992 |
| JP | 5-261206 | 10/1993 |
| JP | 5-261207 | 10/1993 |
| JP | 5-271689 | 10/1993 |
| JP | 8-196811 | 8/1996 |
| JP | 8-309104 | 11/1996 |

OTHER PUBLICATIONS

Database WPI on EAST, week 199706, London: Derwent Publications, Ltd., AN 1997–060131, Class A25, JP 08309104 A, Shinetsu Chem Ind Co Ltd) abstract, 1997.*
Patent Abstracts of Japan for 08196811, Aug. 6, 1996.
Patent Abstracts of Japan for 08309104, Nov. 26, 1996.
Patent Abstracts of Japan for 02180603, Jul. 13, 1990.
Patent Abstracts of Japan for 05261206, Oct. 12, 1993.
Patent Abstracts of Japan for 05261207, Oct. 12, 1993.

* cited by examiner

*Primary Examiner*—Daniel S. Metzmaier
(74) *Attorney, Agent, or Firm*—Millen, White, Zelano & Branigan, P.C.

(57) ABSTRACT

An antifoaming composition contains (A) 58 to 90% by weight of an oil compound and (B) 10 to 42% by weight of a mixture. The oil compound (A) consisting essentially of (i) 80 to 99.9% by weight of an organopolysiloxane composed of $R^1{}_3SiO_{1/2}$, $R^1{}_2SiO_{2/2}$ and $R^1SiO_{3/2}$ units in a ratio of (0.1 to 5):(90 to 99.8):(0.1 to 5) by mol % and (ii) 0.1 to 20% by weight of finely divided silica. The mixture (B) consisting essentially of (iii) 30 to 90% by weight of a polyoxyalkylene-modified silicone oil having a viscosity of 120,000 to 1,000,000 centipoise at 25° C. and (iv) 1 to 70% by weight of a polyhydric alcohol alkyl ether having a molecular weight of 50 to 300. The composition has improved antifoaming properties, water dispersibility and stability.

15 Claims, No Drawings

ANTIFOAMING COMPOSITIONS

This invention relates to antifoaming compositions having improved antifoaming properties, water dispersibility and stability.

BACKGROUND OF THE INVENTION

Because of their superior antifoaming properties, silicone base antifoaming agents are used in a variety of industrial areas covering synthetic resins, synthetic rubber, oils and fats, fermentation, foods, fibers, petroleum, and medicines. Among others, antifoaming compositions for use under rigorous conditions including high temperatures, high pH and high shear forces are known from JP-B 52-19836, JP-B 52-22638, and JP-B 55-23084. For these compositions, further improvements in antifoaming properties were desired. To meet such demands, JP-B 3-14481, JP-B 3-14482, JP-A 63-147507, JP-A 1-317505 and JP-A 3-188905 propose compositions primarily comprising an organopolysiloxane having crosslinking units incorporated therein. These compositions, however, lack stability.

More recently, JP-A 5-271689, JP-A 8-196811 and JP-A 8-309104 propose oil compounds primarily comprising an organopolysiloxane having branched units incorporated in its structure. The antifoaming properties of these compounds are fairly improved, but not yet satisfactory.

SUMMARY OF THE INVENTION

An object of the invention is to provide an antifoaming composition having improved antifoaming properties, water dispersibility and stability.

The invention provides an antifoaming composition comprising (A) 58 to 90% by weight of an oil compound and (B) 10 to 42% by weight of a mixture. The oil compound (A) consists essentially of (i) 80 to 99.9% by weight of an organopolysiloxane and (ii) 0.1 to 20% by weight of finely divided silica. The organopolysiloxane (i) is composed of $R^1_3SiO_{1/2}$ units, $R^1_2SiO_{2/2}$ units and $R^1SiO_{3/2}$ units wherein $R^1$ is independently a monovalent organic group of 1 to 20 carbon atoms, has a structure giving a compositional ratio of $R^1_3SiO_{1/2}$ units:$R^1_2SiO_{2/2}$ units:$R^1SiO_{2/3}$ units=(0.1 to 5):(90 to 99.8):(0.1 to 5) by mol %, and has a viscosity of 100 to 1,000,000 centipoise at 25° C. The mixture (B) consists essentially of (iii) 30 to 99% by weight of a polyoxyalkylene-modified silicone oil of the following structural formula (1) and having a viscosity of 5,000 to 1,000,000 centipoise at 25° C. and (iv) 1 to 70% by weight of a polyhydric alcohol alkyl ether having a molecular weight of 50 to 500.

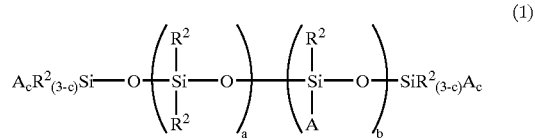

(1)

In formula (1), $R^2$ is independently a monovalent organic group of 1 to 20 carbon atoms, A is a polyoxyalkylene-bearing group represented by $-R^3-O(CH_2CH_2O)_p(CH_2CH(CH_3)O)_q-R^4$ wherein $R^3$ is a divalent hydrocarbon group of 1 to 4 carbon atoms, $R^4$ is hydrogen or an alkyl, acyl or isocyanate group of 1 to 6 carbon atoms, p and q are numbers satisfying $10 \leq p+q \leq 100$ and $10/90 \leq p/q \leq 100/0$, the letters a and b are numbers satisfying $10 \leq a+b \leq 1000$ and $50/50 \leq a/b \leq 99/1$, and c is equal to 0 or 1.

A surfactant other than the polyoxyalkylene-modified silicone oil may be blended in the antifoaming composition in an amount of 0.1 to 50 parts by weight per 100 parts by weight of components (A) and (B) combined. This antifoaming composition can be dispersed in an aqueous dispersion of a water-soluble polymer.

The antifoaming composition of the invention exhibits improved antifoaming properties, good water dispersibility and high stability.

DESCRIPTION OF THE PREFERRED EMBODIMENTS

Briefly stated, the antifoaming composition of the invention contains (A) an oil compound and (B) a mixture as main components. The oil compound (A) is a main component for endowing the composition with antifoaming properties. The oil compound (A) consists essentially of (i) an organopolysiloxane and (ii) finely divided silica.

The organopolysiloxane (i) used herein consists essentially of the following structural units.

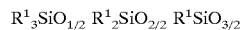

$R^1_3SiO_{1/2}$ $R^1_2SiO_{2/2}$ $R^1SiO_{3/2}$

Herein $R^1$ is independently selected from substituted or unsubstituted monovalent organic (hydrocarbon) groups of 1 to 20 carbon atoms, for example, alkyl groups such as methyl, ethyl, propyl, butyl, pentyl, hexyl, heptyl, octyl, nonyl, decyl, dodecyl, tetradecyl, hexadecyl, and octadecyl; cycloalkyl groups such as cyclohexyl; alkenyl groups such as vinyl and allyl; aryl groups such as phenyl and tolyl; and substituted ones of these groups in which some or all of the hydrogen atoms attached to carbon atoms are replaced by halogen atoms, cyano groups, etc. such as chloromethyl, 3-chloropropyl, 3,3,3-trifluoropropyl, and cyanoethyl. It is recommended that methyl account for at least 90 mol % of the entire $R^1$ groups.

Appropriate amounts of the $R^1_3SiO_{1/2}$, $R^1_2SiO_{2/2}$ and $R^1SiO_{3/2}$ units are combined to constitute the organopolysiloxane. If the quantity of $R^1_3SiO_{1/2}$ units is less than 0.1 mol %, the organopolysiloxane has a too high viscosity to handle. If the quantity of $R^1_3SiO_{1/2}$ units exceeds 5 mol %, the organo-polysiloxane has a too low viscosity to reduce foaming. If the quantity of $R^1_2SiO_{2/2}$ units is less than 90 mol %, the organopolysiloxane has a too low viscosity to reduce foaming. If the quantity of $R^1_2SiO_{2/2}$ units exceeds 99.8 mol %, the organopolysiloxane has a too high viscosity to handle. If the quantity of $R^1SiO_{3/2}$ units is less than 0.1 mol %, antifoaming properties become poor. If the quantity of $R^1SiO_{3/2}$ units exceeds 5 mol %, the organopolysiloxane has a too high viscosity to handle. For this reason, these units are contained to give a compositional ratio of $R^1_3SiO_{1/2}$ units:$R^1_2SiO_{2/2}$ units:$R^1SiO_{3/2}$ units =(0.1 to 5):(90 to 99.8):(0.1 to 5), and preferably (1 to 3):(94 to 98):(1 to 3) as expressed in mol %.

A lower viscosity is desirable from the standpoints of ease of dispersion and working of the organopolysiloxane, while a higher viscosity is desirable from the standpoint of foam suppression. With a viscosity of less than 100 centipoise, the resulting composition becomes less antifoaming. With a viscosity in excess of 1,000,000 centipoise, it becomes difficult to work the organopoly-siloxane into an emulsion. Then the organopolysiloxane should have a viscosity of 100 to 1,000,000 centipoise at 25° C. and preferably 1,000 to 100,000 centipoise at 25° C.

Finely divided silica (ii) used herein may be any well-known silica including wet silica and dry silica. Examples of silica powder include precipitated silica, silica xerogel, and fumed silica, which may be further surface treated to be hydrophobic. They are commercially available under the trade name of Aerosil from Nippon Aerosil K.K., Nipsil from Nippon Silica K.K., Cabosil from Cabonet, and Santocel from Monsanto Industrial Chemicals Co. Since better antifoaming properties are achieved with silica having a greater specific surface area, silica should preferably have a specific surface area of at least 100 m$^2$/g, and more preferably at least 200 m$^2$/g, as measured by the BET method.

If the amount of finely divided silica blended is less than 0.1% by weight of the oil compound (A), foam suppression becomes poor. If the amount of silica is more than 20% by weight, the oil compound has a too high viscosity to handle. For this reason, the amount of finely divided silica blended is 0.1% to 20% by weight, and preferably 1% to 10% by weight based on the oil compound (A).

The oil compound (A) can be prepared by mixing predetermined amounts of the organopolysiloxane and silica powder in a mixer having an appropriate agitating mechanism, heat treating the mixture at 60 to 200° C. while mixing, and optionally, distilling off low-boiling fractions. Inorganic ammonium salts, organosilicon compounds and siloxane resins may be added, if desired, for the purpose of improving the retention of antifoaming ability, high-temperature performance, and dilution stability (see JP-B 4-42043, JP-A 5-261206 and JP-A 5-261207).

In the antifoaming composition of the invention, the mixture (B) consisting essentially of (iii) a polyoxyalkylene-modified silicone oil and (iv) a polyhydric alcohol alkyl ether helps emulsify and disperse the oil compound (A) in an aqueous medium.

Component (iii) is a polyoxyalkylene-modified silicone oil represented by the following formula (1).

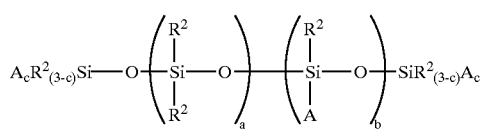

(1)

Herein R$^2$ is independently selected from substituted or unsubstituted monovalent organic (hydrocarbon) groups of 1 to 20 carbon atoms, for example, alkyl groups such as methyl, ethyl, propyl, butyl, pentyl, hexyl, heptyl, octyl, nonyl, decyl, dodecyl, tetradecyl, hexadecyl, and octadecyl; cycloalkyl groups such as cyclohexyl; alkenyl groups such as vinyl and allyl; aryl groups such as phenyl and tolyl; and substituted ones of these groups in which some or all of the hydrogen atoms attached to carbon atoms are replaced by halogen atoms, cyano groups, etc. such as chloromethyl, 3-chloropropyl, 3,3,3-trifluoropropyl, and cyanoethyl. It is recommended that methyl account for at least 90 mol % of the entire R$^2$ groups.

A is a polyoxyalkylene-bearing group represented by the following formula.

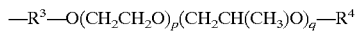

Herein R$^3$ is a divalent hydrocarbon group of 1 to 4 carbon atoms, for example, alkylene groups such as methylene, ethylene, propylene and butylene. R$^4$ is hydrogen or a monovalent organic group of 1 to 6 carbon atoms selected from alkyl groups such as methyl, ethyl, propyl, butyl, pentyl and hexyl, acyl group such as acetyl, propionyl, butyryl, and hexanoyl, and isocyanate groups. If the sum of p+q is less than 10, the antifoaming composition becomes difficult to emulsify and disperse. If the sum of p+q is more than 100, a high viscosity leads to inefficient working. The letters p and q are numbers satisfying 10≦p+q≦100 and preferably 20≦p+q≦70. If the value of p/q is less than 10/90, it becomes difficult to emulsify and disperse the oil compound (A). This requires 10/90≦p/q≦100/0, and preferably 20/80≦p/q≦80/20.

If the sum of a+b is less than 10, the silicone oil has a too low viscosity and the resulting antifoaming composition becomes readily separable and thus unstable. If the sum of a+b is more than 1,000, the silicon oil has a too high viscosity and the resulting antifoaming composition becomes difficult to disperse in water, losing workability. Thus a and b should satisfy 10≦a+b≦1000, and preferably 50≦a+b≦500. If the value of a/b is less than 50/50 or greater than 99/1, the antifoaming composition becomes difficult to emulsify and disperse. This requires 50/50≦a/b≦99/1, and preferably 80/20≦a/b≦95/5. The letter c is equal to 0 or 1.

Preferably, the polyoxyalkylene-modified silicone oil is liquid at room temperature. If its viscosity at 25° C. is less than 5,000 centipoise, the resulting antifoaming composition becomes readily separable and thus unstable. If its viscosity is greater than 1,000,000 centipoise, the resulting antifoaming composition becomes difficult to disperse in water, losing workability. Thus the polyoxyalkylene-modified silicone oil has a viscosity of 5,000 to 1,000,000 centipoise at 25° C. and preferably 10,000 to 500,000 centipoise at 25° C.

It is preferred that component (iii) be dissolved in an aqueous solution of a surfactant in order to increase the dispersibility of the antifoaming composition in a foaming aqueous solution.

Component (iii) can be readily prepared by conventional well-known methods, for example, by effecting addition reaction of a polyoxyalkylene compound having an unsaturated group such as vinyl or allyl at an end of its molecular chain to an organopolysiloxane having a ≡Si—H group in the presence of a platinum catalyst.

Component (iv) is a polyhydric alcohol alkyl ether which serves as an emulsifying aid. By blending component (iv), the mixture (B) is given an adequate fluidity so that the antifoaming composition is improved in uniformity. For this reason, component (iv) is used in admixture with component (iii).

The polyhydric alcohol alkyl ether may be of any desired structure as long as it has a (R$^5$O) group within its molecule wherein R$^5$ is an ethylene or propylene group. It may be straight or branched as shown by the following formula.

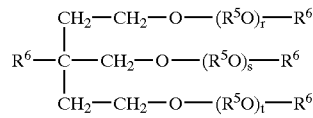

Herein, R$^6$ is independently hydrogen or a monovalent organic group of 1 to 6 carbon atoms, letters r, s and t are integers. Illustrative groups represented by R$^6$ are hydrogen atoms and alkyl groups such as methyl, ethyl, butyl, pentyl and hexyl.

A polyhydric alcohol alkyl ether with a molecular weight of less than 50 has a low viscosity so that the antifoaming composition becomes unstable with the lapse of time. A molecular weight of more than 500 leads to a high viscosity and renders dispersion and working difficult. Therefore, the molecular weight is limited to the range of 50 to 500 and preferably 70 to 300.

If the amount of component (iii) is less than 30% by weight of the mixture (B), the antifoaming composition becomes less dispersible in water. If the amount of component (iii) is more than 99% by weight, the antifoaming composition becomes less uniform. For this reason, the amount of component (iii) is limited to 30% to 99% by weight and preferably 50% to 90% by weight of the mixture (B), with the reminder being component (iv).

The mixture (B) can be prepared by mixing components (iii) and (iv). In one preferred method, during synthesis of component (iii) from reactants, for example, synthesis of component (iii) from reactants by addition reaction, component (iv) is added to and admixed with the reactants. Then the mixture (B) is obtained in one step.

If the amount of component (A) is less than 58% by weight of the antifoaming composition, the composition becomes less effective to suppress foaming. If the amount of component (A) is more than 90% by weight, the composition becomes less dispersible in water and difficult to handle. Then the amount of component (A) should be 58% to 90% by weight and preferably 60% to 85% by weight of the composition. If the amount of component (B) is less than 10% by weight of the antifoaming composition, the composition becomes less dispersible in water. If the amount of component (B) is more than 42% by weight, the composition becomes less effective to suppress foaming. Then the amount of component (B) should be 10% to 42% by weight and preferably 15% to 40% by weight of the composition.

In order to further improve the dispersibility in water of the antifoaming composition comprising components (A) and (B), at least one surfactant other than component (iii) is preferably added as component (C). Any well-known surfactants may be used as component (C). Examples include sorbitan fatty acid esters, glycerin fatty acid esters, polyglycerin fatty acid esters, propylene glycol fatty acid esters, sucrose fatty acid esters, polyoxyethylene alkyl ethers, polyoxypropylene alkyl ethers, polyoxyethylene alkyl phenyl ethers, polyoxyethylene fatty acid esters, polyoxyethylene sorbitan fatty acid esters, polyoxyethylene sorbitol fatty acid esters, polyoxyethylene glycerin fatty acid esters, polyoxyethylene propylene glycol fatty acid esters, polyoxyethylene castor oil, polyoxyethylene hydrogenated castor oil, polyoxyethylene phytostanol ether, polyoxyethylene phytosterol ether, polyoxyethylene cholesterol ether, polyoxyethylene cholesteryl ether, alkanol amides, saccharide ethers, and saccharide amides. Water dispersibility is further improved by using at least one first surfactant having a HLB value of 1 to 10, preferably 2 to 8 in admixture with at least one second surfactant having a HLB value of 10 to 20, preferably 12 to 18. The first and second surfactants are preferably admixed in a weight ratio of from 1:9 to 9:1, more preferably from 2:8 to 8:2, and most preferably from 3:7 to 7:3.

If the amount of component (C) blended is less than 0.1 part by weight per 100 parts by weight of components (A) and (B) combined, the effect of improving water dispersibility is not fully exerted. If the amount of component (C) blended is more than 50 part by weight, it can adversely affect foam suppression. Thus the amount of component (C) blended is 0.1 to 50 parts, preferably 1 to 10 parts by weight per 100 parts by weight of components (A) and (B) combined.

The antifoaming composition of the invention can be prepared by mixing predetermined amounts of components (A) and (B) and optionally, component (C). Using a mixer such as a homomixer, Universal Mixer™, Ultra Mixer™, Planetary Mixer™ or Combimix™, these components are mixed until uniform. The mixing method is not critical. For example, the components are mixed while heating at a temperature of 40 to 150° C.

In one preferred embodiment, an antifoaming composition obtained by blending components (A), (B) and optionally (C) is dispersed in an aqueous dispersion of a water-soluble polymer. The resulting aqueous antifoaming composition also falls within the scope of the invention. The aqueous antifoaming composition ensures easy operation when it is added to a foaming liquid.

The water-soluble polymer used herein may be selected from conventional well-known water-soluble polymers, for example, xanthane gum, starch, methyl cellulose, ethyl cellulose, hydroxyethyl cellulose, carboxymethyl cellulose salts, polyvinyl alcohol, cellulose glycol salts, alginic salts, poly(meth)acrylic salts, long-chain alkyl-modified poly (meth)acrylic salts, and guar gum.

If the amount of the water-soluble polymer added is less than 0.01% by weight of the aqueous antifoaming composition, the composition becomes less stable. If the amount of the water-soluble polymer added is more than 10% by weight, the composition may have a too high viscosity and become less efficient to work with. Thus an appropriate amount of the water-soluble polymer added is 0.01% to 10% by weight and preferably 0.1% to 2% by weight based on the finally obtained aqueous antifoaming composition.

One preferred method for dispersing the antifoaming composition having components (A), (B) and optional (C) blended therein in an aqueous dispersion of a water-soluble polymer involves first mixing predetermined amounts of components (A), (B) and (C) as described above, adding a water-soluble polymer dispersion to the mixture, and mixing the resulting mixture in such a mixer as a homomixer until uniform. The mixing method is not critical. For example, the ingredients are mixed while heating at a temperature of 40 to 150° C.

EXAMPLE

Examples of the invention are given below together with examples of synthesizing silicone oils and preparing oil compounds. These examples are not intended to limit the invention thereto. The viscosity is a measurement at 25° C. Unless otherwise stated, all percents are by weight.

Synthetic Example 1

A mixture of 8.5 g of 1,1,1,3,5,7,7,7-octamethyl-3,5-dihydroxytetrasiloxane, 192 g of octamethylcyclotetrasiloxane, and 0.2 g of tetrabutylphosphonium hydroxide silanolate (containing 10% tetrabutylphosphonium hydroxide) was agitated for 2 hours in a nitrogen stream at a temperature of 110 to 120° C. Then 0.2 g of calcium hydroxide silanolate (containing 10% calcium hydroxide) was added to the mixture, which was agitated for 4 hours at a temperature of 150 to 160° C. Thereafter, 0.2 g of ethylene chlorohydrin was added to the mixture at 80 to 90° C., which was agitated for 2 hours at the temperature. The resulting reaction solution was heated for 2 hours at 150 to 160° C. under a vacuum of 10 mmHg to distill off low molecular weight siloxanes, yielding "Silicone Oil A" having a viscosity of 2,100 centipoise. On structural analysis by $^{29}$Si-NMR, Silicone Oil A was identified to have the composition of $[(CH_3)_3SiO_{1/2}]/[(CH_3)_2SiO_{2/2}]/[CH_3SiO_{3/2}]$=2.1/95.8/2.1 (mol %).

Synthetic Example 2

"Silicone Oil B" having a viscosity of 8,000 centipoise was synthesized as in Synthetic Example 1 except that 4.5 g of 1,1,1,3,5,7,7,7-octamethyl-3,5-dihydroxytetrasiloxane and 195 g of octamethylcyclotetra-siloxane were used. On structural analysis by $^{29}$Si-NMR, Silicone Oil B was identified to have the composition of [(CH$_3$)$_3$SiO$_{1/2}$]/[(CH$_3$)$_2$SiO$_{2/2}$]/[CH$_3$SiO$_{3/2}$]=1.0/98.0/1.0 (mol %).

Oil Compound Preparation Example 1

Admitted into a 500-ml planetary mixer (Tokushu Kika Industry K.K.) were 276 g of "Silicone Oil A" obtained in Synthetic Example 1 as the silicone oil and 24 g of Nipsil HD-2 (trade name, Nippon Silica K.K., specific surface area 300 m$^2$/g) as the finely divided silica. In a nitrogen gas stream, the ingredients were agitated at 150° C. for 2 hours, obtaining Oil Compound (A)-1.

Oil Compound Preparation Example 2

Oil Compound (A)-2 was prepared as in Oil Compound Preparation Example 1 except that 276 g of "Silicone Oil B" was used instead of 276 g of "Silicone Oil A."

Oil Compound Preparation Example 3

Oil Compound (A)-3 was prepared by using 285 g of "Silicone Oil B" obtained in Synthetic Example 2 as the silicone oil and 15 g of silica in the form of Aerosil 200 (trade name, Nippon Aerosil K.K., specific surface area 200 m$^2$/g) hydrophobicized by surface treatment with (CH$_3$)$_3$SiNHSi(CH$_3$)$_3$ as the finely divided silica, adding 0.9 g of ammonium carbonate (Kanto Chemical K.K.), and mixing the ingredients in a nitrogen gas stream at 150° C. for 3 hours.

Oil Compound Preparation Example 4

Oil Compound (A)-4 was prepared as in Oil Compound Preparation Example 1 except that 276 g of dimethylsilicone oil having a viscosity of 2,000 centipoise was used instead of 276 g of "Silicone Oil A."

Component (B) Synthesis Example 1

A 1-liter glass flask equipped with an agitator having an agitating anchor blade, a Dimroth reflux condenser, and a thermometer was charged with 90 g of "Organopolysiloxane-1," 332 g of "Allylated Polyether-1," both shown below, 103 g of dipropylene glycol monomethyl ether, 1.5 g of a 10% ethanol solution of potassium. acetate, and 0.1 g of a 5% n-butanol solution of chloroplatinic acid. The ingredients were agitated at 100° C. for 6 hours, yielding a pale yellow uniform mixture (B)-1 having a viscosity of 1,700 centipoise. The mixture (B)-1 was stripped at 140 to 150° C. under a vacuum of 2 mmHg, yielding a pale yellow uniform material (B)(iii)-1 having a viscosity of 230,000 centipoise. It was found that the mixture (B)-1 contained 80% of the material (B)(iii)-1.

Organopolysiloxane-1

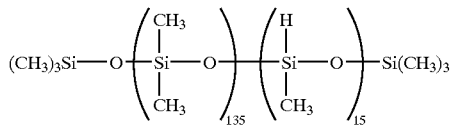

Allylated Polyether-1

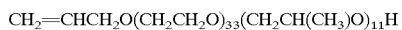

(B)(iii)-1

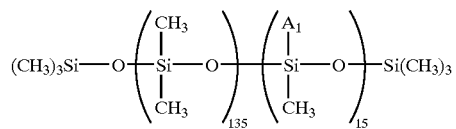

A$_1$: —CH$_2$CH$_2$CH$_2$O(CH$_2$CH$_2$O)$_{33}$(CH$_2$CH(CH$_3$)O)$_{11}$H

Component (B) Synthesis Example 2

The procedure of Component (B) Synthesis Example 1 was repeated except that 90 g of "Organopolysiloxane-1" was changed to 100 g of "Organopolysiloxane-2," the amount of "Allylated Polyether-1" was changed from 332 g to 280 g, and the amount of dipropylene glycol monomethyl ether was changed from 103 g to 250 g. There was obtained a pale yellow uniform mixture (B)-2 having a viscosity of 200 centipoise. The mixture (B)-2 was similarly stripped, yielding a pale yellow uniform material (B)(iii)-2 having a viscosity of 170,000 centipoise. It was found that the mixture (B)-2 contained 60% of the material (B)(iii)-2.

Organopolysiloxane-2

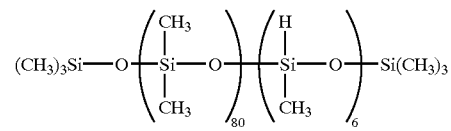

(B)(iii)-2

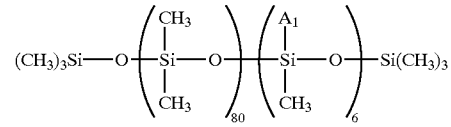

A$_1$: —CH$_2$CH$_2$CH$_2$O(CH$_2$CH$_2$O)$_{33}$(CH$_2$CH(CH$_3$)O)$_{11}$H

Component (B) Synthesis Example 3

The procedure of Component (B) Synthesis Example 2 was repeated except that 280 g of "Allylated Polyether-1" was changed to 260 g of "Allylated Polyether-2," and 103 g of dipropylene glycol monomethyl ether was changed to 120 g of diethylene glycol monoethyl ether. There was obtained a pale yellow uniform mixture (B)-3 having a viscosity of 1,200 centipoise. The mixture (B)-3 was similarly stripped, yielding a pale yellow uniform material (B)(iii)-3 having a viscosity of 120,000 centipoise. It was found that the mixture (B)-3 contained 75% of the material (B)(iii)-3.

Allylated Polyether-2

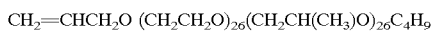

(B)(iii)-3

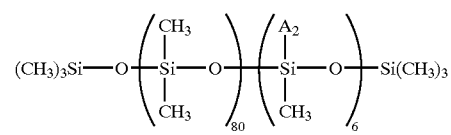

A$_2$:
—CH$_2$CH$_2$CH$_2$O(CH$_2$CH$_2$O)$_{26}$(CH$_2$CH(CH$_3$)O)$_{26}$C$_4$H$_9$

Component (B) Synthesis Example 4

The procedure of Component (B) Synthesis Example 1 was repeated except that 332 g of "Allylated Polyether-1" was changed to 193 g of "Allylated Polyether-3." There was obtained a pale yellow uniform mixture (B)-4 having a viscosity of 200 centipoise. The mixture (B)-4 was similarly stripped, yielding a pale yellow uniform material (B)(iii)-4 having a viscosity of 80,000 centipoise. It was found that the mixture (B)-4 contained 73% of the material (B)(iii)-4.

Allylated Polyether-3

(B)(iii)-4

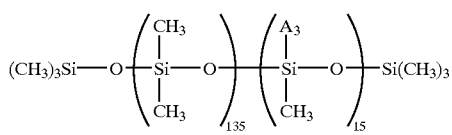

$A_3$: —$CH_2CH_2CH_2O(CH_2CH_2O)_5(CH_2CH(CH_3)O)_{20}H$

Component (B) Synthesis Example 5

The procedure of Component (B) Synthesis Example 1 was repeated except that 90 g of "Organopolysiloxane-3" was changed to 100 g of "Organopolysiloxane-3" and the amount of "Allylated Polyether-1" was changed from 332 g to 337 g. There was obtained a pale yellow uniform mixture (B)-5 having a viscosity of 150 centipoise. The mixture (B)-5 was similarly stripped, yielding a pale yellow uniform material (B)(iii)-5 having a viscosity of 2,500 centipoise. It was found that the mixture (B)-5 contained 81% of the material (B)(iii)-5.

Organopolysiloxane-3

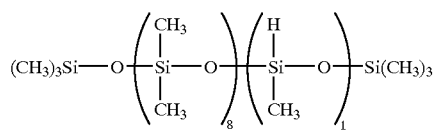

(B)(iii)-5

$A_1$:—$CH_2CH_2CH_2O(CH_2CH_2O)_{33}(CH_2CH(CH_3)O)_{11}H$

Component (B) Synthesis Example 6

The procedure of Component (B) Synthesis Example 1 was repeated except that the amount of dipropylene glycol monomethyl ether was changed from 103 g to 3.4 g. There was obtained a pale yellow uniform mixture (B)-6 having a viscosity of 190,000 centipoise. The mixture (B)-6 was similarly stripped, yielding a pale yellow uniform material (B)(iii)-1 having a viscosity of 230,000 centipoise. It was found that the mixture (B)-6 contained 99.2% of the material (B) (iii)-1.

Example 1

Into a 500-ml planetary mixer were admitted 70 g of Oil Compound (A)-1, 30 g of Mixture (B)-1, and 6 g of sorbitan monostearate (referred to as (C)-1, HLB 4.7) and 6 g of polyoxyethylene fatty acid ester (referred to as (C)-2, HLB 19.1) as component (C). The ingredients were agitated at 70 to 80° C. for one hour, yielding a pale yellowish white "Composition-1" having a viscosity of 100,000 centipoise. "Composition-1", 30 g, was admitted into a 500-ml glass beaker and heated to 60° C. With 20 g of hot water at 60° C. added, the composition was mixed for 30 minutes by a homomixer at 1,500 rpm. Further, 50 g of water was added thereto, obtaining a uniform "Aqueous Dispersion-1." This "Aqueous Dispersion-1," was subject to a foam suppression test to be described below. The foaming volume after the test was 150 ml.

Foam suppression test

To a 0.1% aqueous solution of Emulgen 909 (trade name of polyoxyethylene nonyl phenyl ether by Kao K.K.) in a 1-liter measuring cylinder, 100 ppm of "Aqueous Dispersion-1" was added. By an air bubbling method of blowing air into the solution at room temperature at a rate of 1 liter/min through a glass diffuser stone, the solution was bubbled for 20 minutes. The foaming volume was measured as the sum (ml) of the volume of bubbles+the volume of liquid.

Examples 2–10 & Comparative Examples 1–4

As in Example 1, antifoaming compositions were prepared using the blending amounts shown in Table 1. Thereafter, aqueous dispersions were prepared from the antifoaming compositions as in Example 1. These aqueous dispersions were subject to the foam suppression test. The results are shown in Table 1.

Example 11

"Composition-1" obtained in Example 1, 30 g, was admitted into a 500-ml glass beaker and heated to 60° C. With 20 g of hot water at 60° C. added, the composition was mixed for 30 minutes by a homomixer at 1,500 rpm. Further, 50 g of a 0.3% xanthane gum aqueous solution was added thereto, obtaining a uniform aqueous dispersion. This aqueous dispersion was subject to the foam suppression test as in Example 1. The foaming volume was 150 ml. This aqueous dispersion remained stable and uniform even after 3 months of storage.

Example 12

An aqueous dispersion was obtained as in Example 1 except that 50 g of the 0.3% xanthane gum aqueous solution was changed to 50 g of a 1.8% sodium carboxymethyl cellulose aqueous solution. This aqueous dispersion was similarly subject to the foam suppression test, finding a foaming volume of 150 ml. This aqueous dispersion remained stable and uniform even after 3 months of storage.

TABLE 1

| | Component (A) | | Component (B)-(iii) | | Component (C) | | | | Foaming volume (ml) |
|---|---|---|---|---|---|---|---|---|---|
| | Type | Amount (g) | Type | Amount (g) | Type | Amount (g) | Type | Amount (g) | |
| EX1 | (A)-1 | 70 | (B)-1 | 30 | (C)-1 | 6 | (C)-2 | 6 | 150 |
| EX2 | (A)-1 | 70 | (B)-2 | 30 | (C)-1 | 6 | (C)-2 | 6 | 210 |
| EX3 | (A)-1 | 70 | (B)-3 | 30 | (C)-1 | 6 | (C)-2 | 6 | 200 |
| EX4 | (A)-2 | 70 | (B)-1 | 30 | (C)-3 | 6 | (C)-2 | 6 | 150 |
| EX5 | (A)-3 | 70 | (B)-1 | 30 | (C)-3 | 6 | (C)-2 | 6 | 130 |
| EX6 | (A)-3 | 60 | (B)-1 | 40 | (C)-4 | 6 | (C)-2 | 6 | 190 |
| EX7 | (A)-3 | 80 | (B)-1 | 20 | (C)-4 | 6 | (C)-2 | 6 | 120 |
| EX8 | (A)-1 | 70 | (B)-1 | 30 | (C)-1 | 6 | — | 0 | 170 |
| EX9 | (A)-1 | 70 | (B)-1 | 30 | (C)-1 | 1 | (C)-2 | 1 | 230 |
| EX10 | (A)-1 | 70 | (B)-1 | 30 | (C)-1 | 10 | (C)-2 | 6 | 200 |
| EX11 | (A)-1 | 70 | (B)-1 | 30 | (C)-1 | 6 | (C)-2 | 10 | 220 |
| EX12 | (A)-3 | 60 | (B)-1 | 40 | — | 0 | — | 0 | 330 |
| CE1 | (A)-4 | 70 | (B)-1 | 30 | (C)-1 | 6 | (C)-2 | 6 | >1,000 |
| CE2 | (A)-1 | 70 | (B)-4 | 30 | (C)-1 | 6 | (C)-2 | 6 | 640 |
| CE3 | (A)-1 | 70 | (B)-5 | 30 | (C)-1 | 6 | (C)-2 | 6 | >1,000 |
| CE4 | (A)-1 | 70 | (B)-6 | 30 | (C)-1 | 6 | (C)-2 | 6 | 460 |

(C)-3: glycerin monooleate (HLB 3.5)
(C)-4: polyoxyethylene nonyl phenyl ether (EO addition moles 3, HLB 6.0)

There has been described an antifoaming composition which has excellent antifoaming properties, is effectively dispersible in water, and remains stable.

Japanese Patent Application No. 11-052341 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. An antifoaming composition comprising (A) 58 to 90% by weight of an oil compound and (B) 10 to 42% by weight of a mixture, the oil compound (A) consisting essentially of (i) 80 to 99.9% by weight of an organopolysiloxane composed of $R^1_3SiO_{1/2}$ units, $R^1_2SiO_{2/2}$ units and $R^1SiO_{3/2}$ units wherein R1 is independently a monovalent organic group of 1 to 20 carbon atoms, in a ratio of $R^1_3SiO_{1/2}$ units:$R^1_2SiO_{2/2}$ units:$R^1SiO_{3/2}$ units=(0.1 to 5):(90 to 99.8):(0.1 to 5) by mol % and having a viscosity of 100 to 1,000,000 centipoise at 25° C., and (ii) 0.1 to 20% by weight of finely divided silica, the mixture (B) consisting essentially of (iii) 30 to 90% by weight of a polyoxyalkylene-modified silicone oil of the following structural formula (I) and having a viscosity of 120,000 to 1,000,000 centipoise at 25° C.

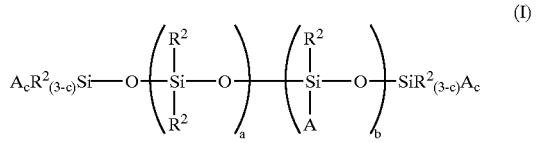

(I)

wherein $R^2$ is independently a monovalent organic group of 1 to 20 carbon atoms, A is a polyoxyalkylene-bearing group represented by $—R^3—O(CH_2CH_2O)_p(CH_2CH(CH_3)O)_q—R^4$ wherein $R^3$ is a divalent hydrocarbon group of 1 to 4 carbon atoms, $R^4$ is hydrogen or an alkyl, acyl or isocyanate group of 1 to 6 carbon atoms, p and q are numbers satisfying $10 \leq p+q \leq 100$ and $10/90 \leq p/q \leq 100/0$, the letters a and b are numbers satisfying $10 \leq a+b \leq 1000$ and $50/50 \leq a/b \leq 99/1$, and c is equal to 0 or 1, and (iv) 1 to 70% by weight of a polyhydric alcohol alkyl ether having a molecular weight of 50 to 300 and having at least one ($R^5O$) group where $R^5$ is an ethylene or propylene group.

2. The antifoaming composition of claim 1 further comprising (C) 0.1 to 50 parts by weight by 100 parts by weight of components (A) and (B) combined of a surfactant other than the polyoxyalkylene-modified silicone oil and the polyhydric alcohol alkyl ether.

3. The antifoaming composition of claim 2, wherein (C) is a sorbitan fatty acid ester, a glycerin fatty acid ester, a polyglycerin fatty acid ester, a propylene glycol fatty acid ester, a sucrose fatty acid ester, a polyoxyethylene alkyl ether, a polyoxypropylene alkyl ether, a polyoxyethylene alkyl phenyl ether, a polyoxyethylene fatty acid ester, a polyoxyethylene sorbitan fatty acid ester, a polyoxyethylene sorbitol fatty acid ester, a polyoxyethylene glycerin fatty acid ester, a polyoxyethylene propylene glycol fatty acid ester, a polyoxyethylene castor oil, a polyoxyethylene hydrogenated castor oil, a polyoxyethylene phytostanol ether, a polyoxyethylene phytosterol ether, a polyoxyethylene cholesterol ether, a polyoxyethylene cholesteryl ether, an alkanol amide, a saccharide ether, or a saccharide amide.

4. The antifoaming composition of claim 1, wherein, for the organopolysiloxane, the $R^1$ groups are independently alkyl, cycloalkyl, alkenyl, phenyl or tolyl of 1 to 20 carbon atoms which optionally have hydrogen atoms replaced by halogen atoms or cyano groups.

5. The antifoaming composition of claim 1, wherein, for the organopolysiloxane, 90% of the $R^1$ groups are methyl.

6. The antifoaming composition of claim 1, wherein the finely divided silica has a specific surface area of at least 100 $m^2/g$ as measured by the BET method.

7. The antifoaming composition of claim 1, wherein, for the polyoxyalkylene-modified silicone oil of formula I, the $R^2$ groups are independently alkyl, cycloalkyl, alkenyl, phenyl or tolyl of 1 to 20 carbon atoms which optionally have hydrogen atoms replaced by halogen atoms or cyano groups; $R^3$ is an alkylene group of 1 to 4 carbon atoms; $R^4$ is a hydrogen or an alkyl, acyl or isocyanate group of 1 to 6 carbon atoms; $20 \leq p+q \leq 70$ and $20/80 \leq p/q \leq 80/20$; and, $50 \leq a+b \leq 500$ and $80/20 \leq a/b \leq 95/5$.

8. The antifoaming composition of claim 1, wherein, for the polyoxyalkylene-modified silicone oil of formula I, 90% of the $R^2$ groups are methyl.

9. The antifoaming composition of claim 1, wherein the polyhydric alcohol alkyl ether is of the following formula:

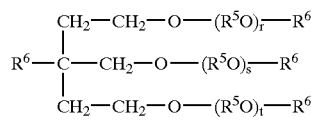

wherein $R^5$ are independently ethylene or propylene; $R^6$ are independently hydrogen or a monovalent organic group of 1 to 6 carbon atoms; and letters r, s and t are integers, such that the molecular weight is 50 to 300.

10. The antifoaming composition of claim 1, wherein the amount of the polyoxyalkylene-modified silicone oil, (iii), in mixture (B) is 50 to 90% by weight.

11. The antifoaming composition of claim 1, which comprises 60–85% of oil compound (A) and 15 to 40% by weight of mixture (B).

12. The antifoaming composition of claim 1, wherein the polyhydric alcohol alkyl ether is straight chained.

13. The antifoaming composition of claim 1, wherein the polyhydric alcohol alkyl ether is branched chained.

14. An antifoaming composition comprising the antifoaming composition of claim 1 dispersed in an aqueous dispersion of a water-soluble polymer wherein the amount of the water-soluble polymer is 0.01% to 10% by weight based on the total antifoaming composition.

15. The antifoaming composition of claim 14, wherein the water-soluble polymer is a xanthane gum, starch, methyl cellulose, ethyl cellulose, hydroxyethyl cellulose, carboxymethyl cellulose salt, polyvinyl alcohol, cellulose glycol salt, alginic salt, poly(meth)acrylic salt, long-chain alkyl-modified poly(meth)acrylic salt or guar gum.

* * * * *